(No Model.)
H. HITCHCOCK.
FRAME FOR REVOLVING HAY RAKES, TEDDERS, &c.
No. 246,676. Patented Sept. 6, 1881.
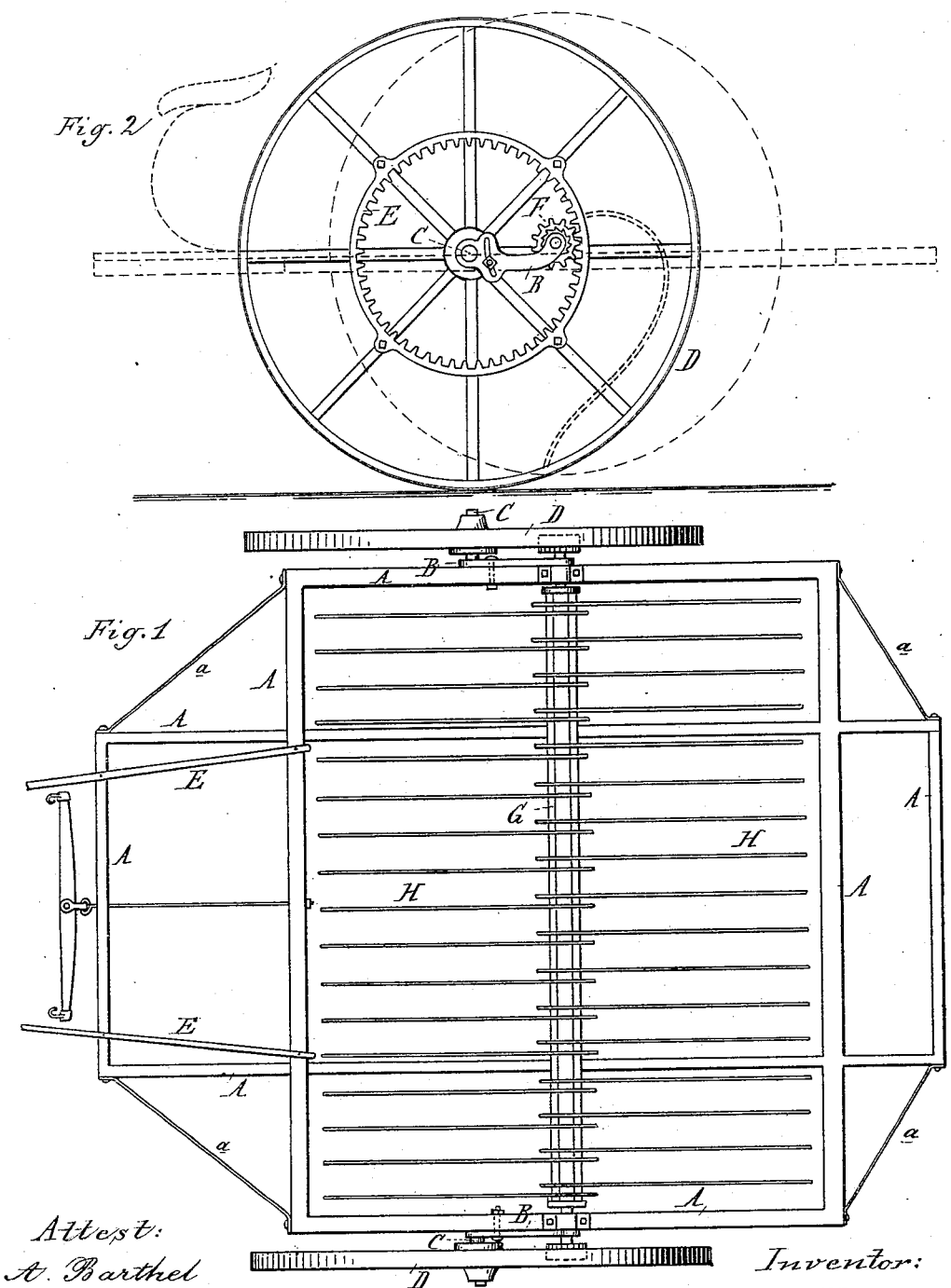
Attest:
A. Barthel
R. S. Mallory
Inventor:
Henry Hitchcock
by Thos. S. Sprague
Att'y

UNITED STATES PATENT OFFICE.

HENRY HITCHCOCK, OF LYONS, MICHIGAN.

FRAME FOR REVOLVING HAY RAKES, TEDDERS, &c.

SPECIFICATION forming part of Letters Patent No. 246,676, dated September 6, 1881.

Application filed July 8, 1881. (No model.)

*To all whom it may concern:*

Be it known that I, HENRY HITCHCOCK, of Lyons, Ionia county, Michigan, have invented an Improvement in Frames for Revolving Hay-Rakes, of which the following is a specification.

The nature of this invention relates to certain new and novel improvements in the construction of frames for revolving hay rakes, tedders, &c., the object of the invention being to construct a frame wherein the necessity of employing caster-wheels or tilting frames is avoided; and to that end the invention consists in the peculiar construction and arrangement of the parts, all as more fully hereinafter set forth.

Figure 1 is top plan. Fig. 2 is elevation of the main driving-wheel.

In the accompanying drawings, which form a part of this specification, A represents the bars which compose the frame of the machine, which are secured together substantially in the form shown, and braced at the corners by the brace-rods a, which give additional rigidity to the frame. To each side of the frame are pivotally secured the plates B at one end, which carry stub-axles C, upon which the traction-wheels D are secured, the plates B being capable of an adjustment upon the frame by means of curved slots in the said plates concentric with the centers of the pinions F, so that the frame may be raised or lowered, as circumstances may require. To the inner side of each of the traction-wheels is secured the internally-toothed gear-wheel E, which engages with a pinion, F, upon the shaft G, which is journaled in proper bearings across the frame, the connection between the pinion F and the shaft being through the medium of a ratchet or clutched pinion of any of the known constructions. To the shaft G are secured the rake or tedder teeth H, which revolve with the shaft entirely within the frame and nearly upon a line with the two stub-axles, as shown.

Draft is applied to the machine by means of the shafts or tongue E'.

By this construction I materially lessen the weight of the machine, while I secure greater strength and rigidity of parts over the old manner of building.

By means of the plates B, connected to the frame and to the wheels, as described, the position of the frame can be readily adjusted without altering the positions of the pinions F in relation to the driving-gear wheels E.

What I claim as my invention is—

1. In a revolving hay rake or tedder, and in combination with the frame A thereof, the plates B, carrying the stub-axles C, said plates being pivotally hung on the revolving shaft G and provided with slots concentric with the center of said shaft, whereby the position of the frame can be adjusted in a radial line from said shaft, substantially as specified.

2. The frame A, wheels D, and driving-gear wheels E of a revolving hay rake or tedder, in combination with the shaft G, pinions F on said shaft, stub-axles C on the plates B, and the plates B, said plates being pivotally hung on the shaft G and provided with slots concentric with the center of the same, substantially as and for the purpose specified.

HENRY HITCHCOCK.

Witnesses:
W. C. HAWLEY, Jr.
M. H. FOX.